(No Model.)
C. MASCHMEYER.
CHANDELIER HOOK.
No. 251,613. Patented Dec. 27, 1881.
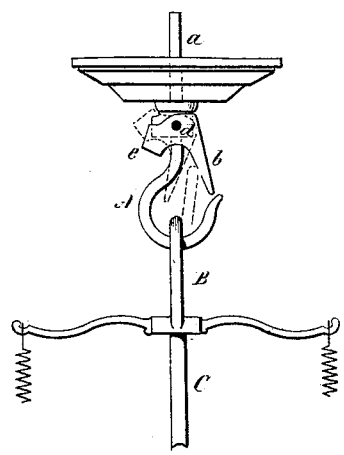
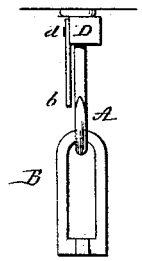
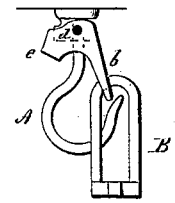
Witnesses: Chas. Maschmeyer
Inventor
By atty.

UNITED STATES PATENT OFFICE.

CHARLES MASCHMEYER, OF MERIDEN, CONNECTICUT, ASSIGNOR TO THE BRADLEY & HUBBARD MANUFACTURING COMPANY, OF SAME PLACE.

CHANDELIER-HOOK.

SPECIFICATION forming part of Letters Patent No. 251,613, dated December 27, 1881.

Application filed November 28, 1881. (No model.)

*To all whom it may concern:*

Be it known that I, CHARLES MASCHMEYER, of Meriden, in the county of New Haven and State of Connecticut, have invented a new Improvement in Chandelier-Hooks; and I do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, an edge view, that is turned one-fourth around from the position in Fig. 1; Fig. 3, a side view to illustrate the operation.

This invention relates to an improvement in the hook which is attached to the ceiling of a room, and from which a lamp-fixture or chandelier may be suspended, and with special reference to that class of chandeliers which are made extensible—that is, so that the lamps may be drawn down and supported at different elevations.

A serious difficulty exists in this class of fixtures, from the fact that when they are raised the lifting upon the lamps to force them upward frequently disengages the chandelier from the hook above. Again, if the lamps are raised by springs or weights, the springs are applied by releasing some latch or catch which engages the fixture to prevent its accidental release; but when such release is made it frequently occurs that the lamp ascends with great rapidity, because the person operating does not thoroughly understand its workings, and releases the hold upon the fixture. This rapid ascension gives to the lamps a movement which is liable to throw the fixture upward out of the hook to which it is hung.

The object of this invention is to prevent this disengagement, and yet permit the fixture to be readily removed from or hung upon the hook as occasion may require; and the invention consists in a weighted tongue pivoted to the shank of the hook, the weight on one side of the pivot and the tongue the other, the weight operating to turn the tongue toward the point of the hook and close the mouth, so as to prevent the accidental displacement of the hanging device, but permit its removal when required.

A represents the hook, of the usual form, and provided with a screw, $a$, or otherwise, for attachment to the ceiling, and so as to receive the loop of the lamp-fixture C. On one side of the shank D of the hook a tongue, $b$, is pivoted, as at $d$, and on the side of the pivot, opposite the mouth of the hook, the tongue is extended to form a weight, $e$, this extension being sufficient to turn the tongue $b$ toward the point, and so as to practically cover or close the mouth of the hook, as seen in Fig 1, but so as to easily turn away from the mouth for the insertion of the loop B, as seen in broken lines, Fig. 1, the weight serving to return the tongue when the proper engagement shall have been made. Thus engaged, any sudden or accidental upward movement of the loop will bring that loop inside the tongue, as indicated in broken lines, and prevent its possible disengagement.

I have shown the tongue as hinged upon one side of the shank of the hook, and this I prefer; yet it may be arranged in a plane in the central line of the shank and hook.

By the arrangement of the tongue upon the side of the shank and out of the plane of the tongue, as seen in Fig. 2, the loop and fixture may be readily disengaged by simply raising the fixture until the loop comes above the point of the hook, and then turning the fixture to bring the loop against the outside of the tongue and over the point of the hook, as seen in Fig. 3, which will turn the tongue backward and permit the loop to pass from the hook.

By this construction the fixture may be hung or taken from the hook without necessarily reaching the hook with the hand, as must be the case with a hook constructed like a common snap-hook, or with a tongue in the same plane as the hook, and not in a different plane substantially parallel with the plane of the hook, as in this case.

I claim—

1. In a chandelier-hook, the weighted tongue $b$, pivoted to the shank of the hook, the tongue extending from the pivot toward the point of the hook, and the weight on the opposite side of the pivot, substantially as and for the purpose described.

2. In a chandelier-hook, the weighted tongue $b$, pivoted on the side of the shank of the hook, the tongue extending toward the point of the hook, and the weight on the opposite side of the pivot arranged to swing in a plane parallel with the plane of the hook, substantially as described.

CHAS. MASCHMEYER.

Witnesses:
CHAS. E. SHELLEY,
F. J. SEIDENSTICKER.